Jan. 12, 1954  J. L. EASTEP  2,665,682
KNOCKDOWN BARBECUE OVEN
Filed Dec. 2, 1949  3 Sheets-Sheet 1
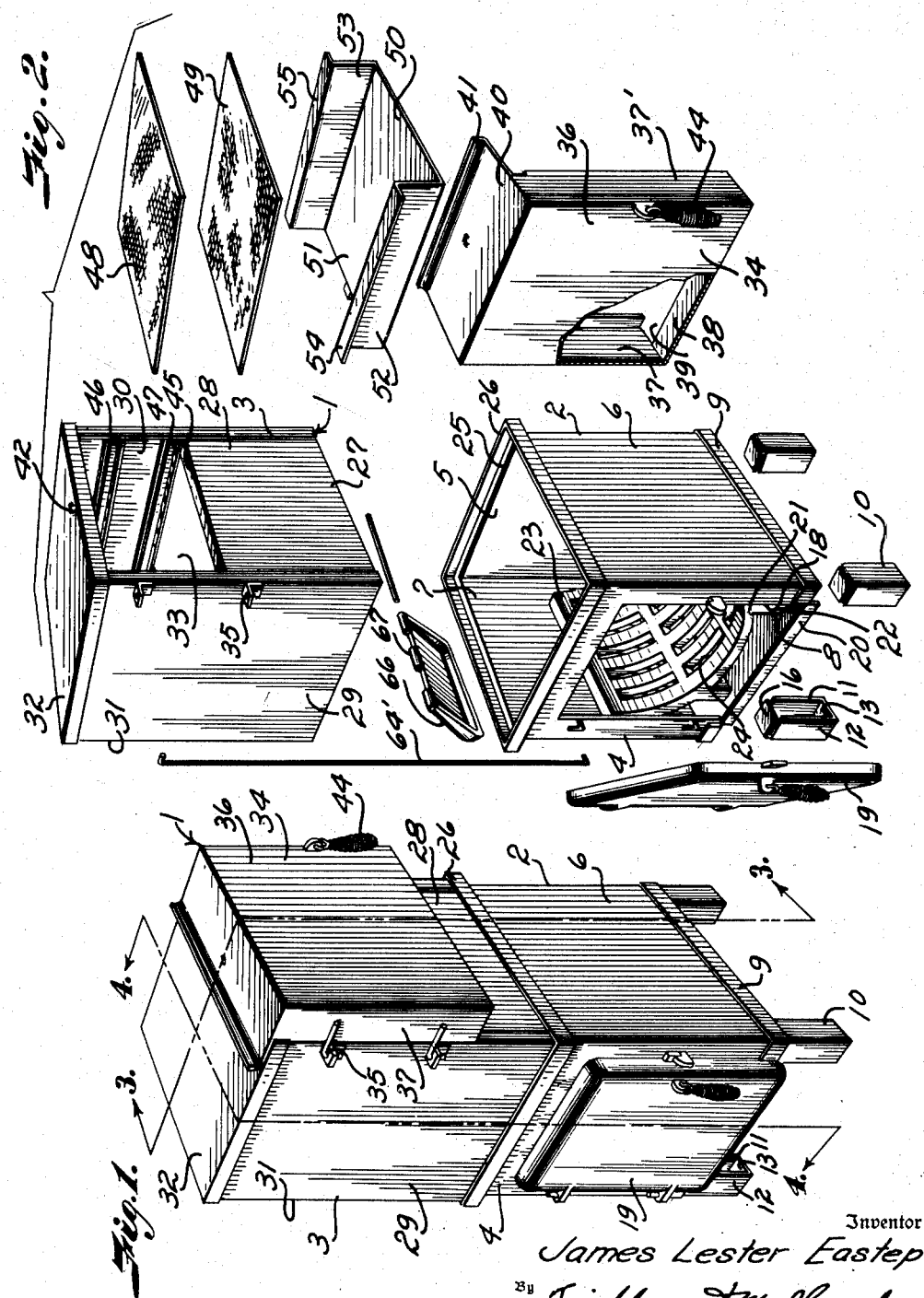
Inventor
James Lester Eastep
By Fishburn Mullendore
Attorneys Jan. 12, 1954  J. L. EASTEP  2,665,682
KNOCKDOWN BARBECUE OVEN
Filed Dec. 2, 1949  3 Sheets-Sheet 2
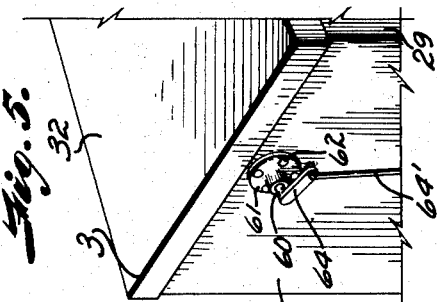
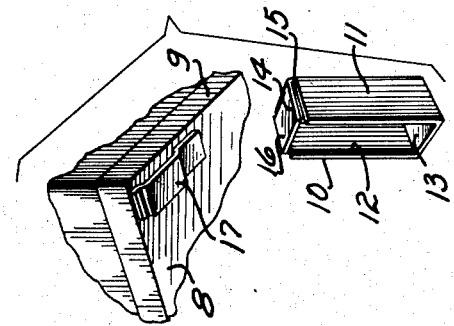
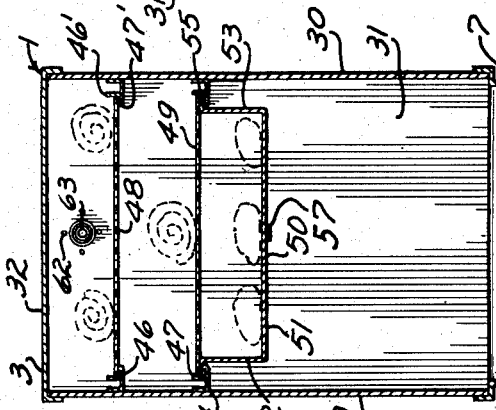
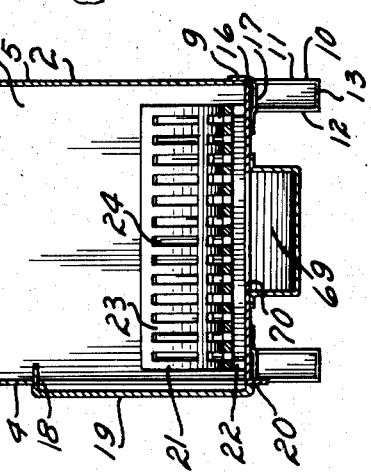
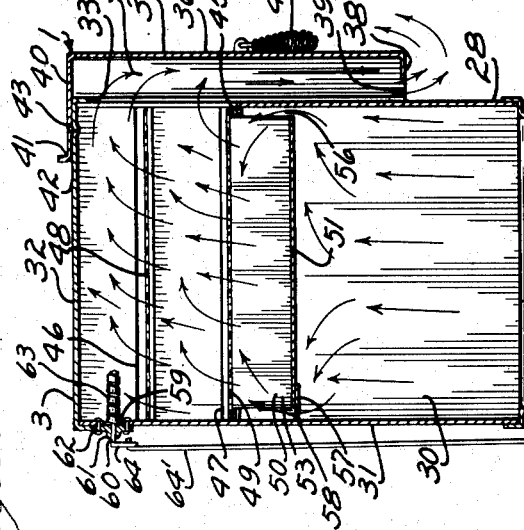
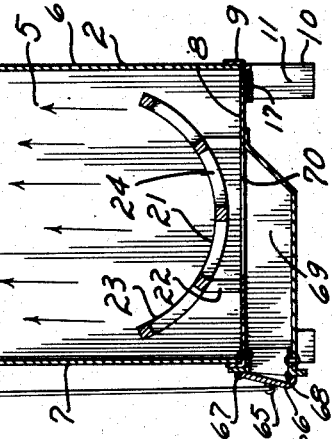
Inventor
James Lester Eastep
By Fishburn & Mullendore
Attorneys.

Jan. 12, 1954   J. L. EASTEP   2,665,682
KNOCKDOWN BARBECUE OVEN
Filed Dec. 2, 1949   3 Sheets-Sheet 3
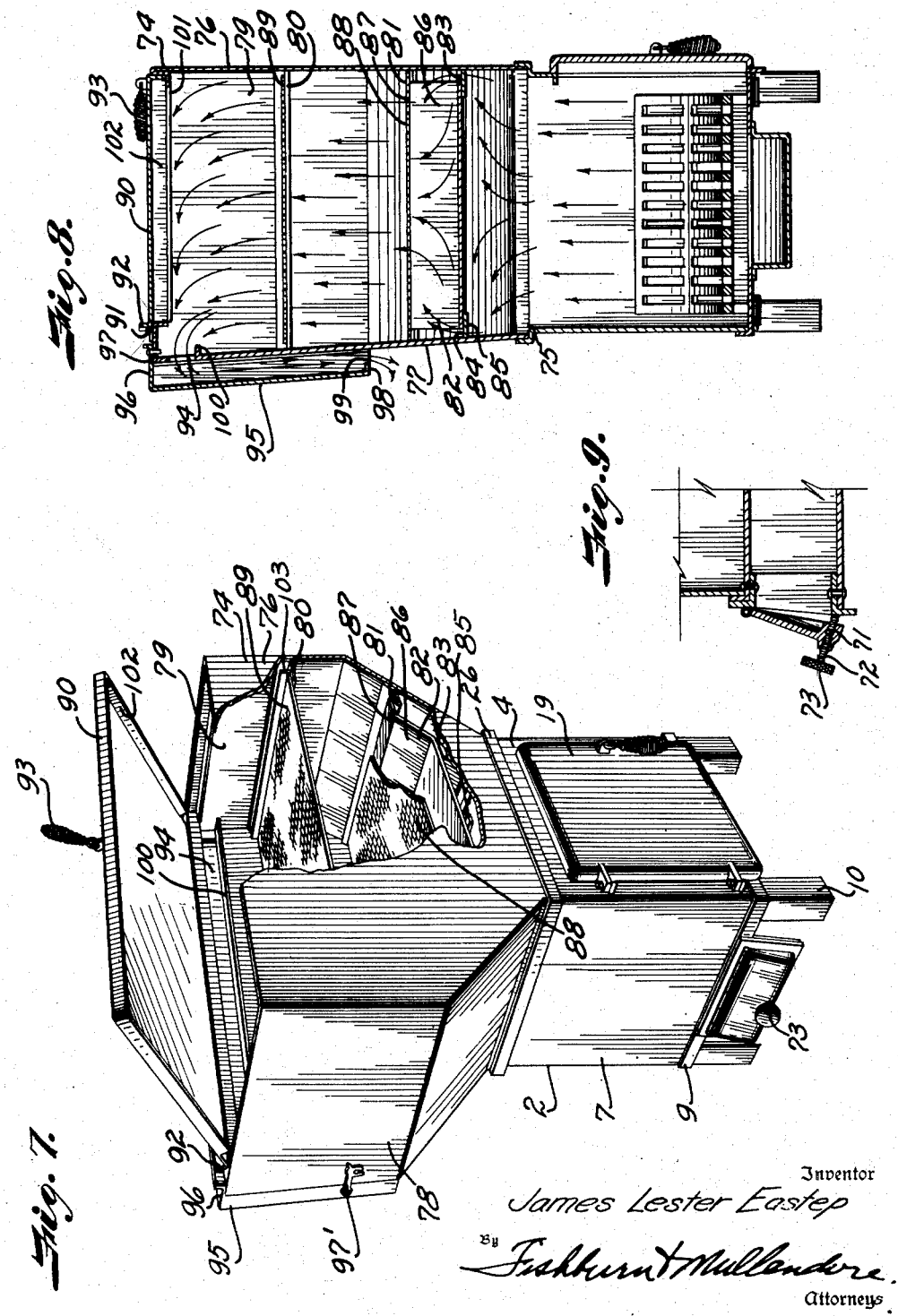
Inventor
James Lester Eastep
By Fishburn + Mullendore
Attorneys Patented Jan. 12, 1954

2,665,682

UNITED STATES PATENT OFFICE 2,665,682

KNOCKDOWN BARBECUE OVEN

James Lester Eastep, Kansas City, Mo.

Application December 2, 1949, Serial No. 130,699

2 Claims. (Cl. 126—9)

This invention relates to portable barbecue ovens, and particularly to ovens of this character of knock-down type which may be transported in a vehicle or the like and set up for use and also for storage in a compact condition.

The principal object of the present invention is to provide an oven of this character wherein pressure is applied to the food in the oven while being cooked.

Other objects of the present invention are to provide a fire pot section adapted to be housed within the oven section for transportation and storage; to provide a removable grill and food racks in the oven section above the fire pot section and storage of the grill and the racks within the fire pot section when nested within the oven section; to provide baffle means in said oven section; to provide an opening in the oven section and a cover for said opening having a passage way for directing the smoke downwardly from the oven section thereby retaining the heat under pressure within the oven section; to provide an automatic draft regulator for the fire pot section, and to provide a device of this character, simple, economical to manufacture and efficient in operation.

In accomplishing these and other objects of the invention, I have provided improved details of structure, the preferred forms of which are shown in the accompanying drawings, wherein:

Fig. 1 is a perspective view of my invention drawn in assembled relation.

Fig. 2 is a perspective view of my invention showing the parts in disassembled relation.

Fig. 3 is a vertical cross section through the device taken on a line 3—3, Fig. 1.

Fig. 4 is a vertical cross section of the invention taken on a line 4—4, Fig. 1.

Fig. 5 is a fragmentary view of the upper rear portion of the device, particularly showing the temperature regulator attached thereto.

Fig. 6 is a fragmentary view of the leg supports and means for attaching the same to the fire pot section.

Fig. 7 is a perspective view of a modified form of the invention with parts broken away to better illustrate the interior thereof.

Fig. 8 is a vertical cross-sectional view of the invention shown in Fig. 7.

Fig. 9 is a fragmentary cross-sectional view particularly illustrating the draft regulator on the fire pot.

Referring more in detail to the drawings:

1 designates a barbecue oven embodying the features of my invention comprising a housing consisting of a fire pot section 2 and oven section 3, preferably made of sheet metal or the like. The fire pot section 2 and oven are substantially square in shape although other shapes may be used without departing from the spirit of my invention. The fire pot section is slightly smaller than the oven section so that it may be housed within the oven section when not in use as later described.

The fire pot section has sides 4 and 5, front 6, rear 7 and bottom 8. The bottom is turned upwardly over the lower end of the fire pot section forming a flange 9 therearound. Legs 10 are provided at each corner of the fire pot section and consist of a trough like structure comprising sides 11 and 12 and ends 13 and 14. The end 14 is slotted down the sides 11 and 12 as indicated at 15 forming a lip 16 adapted to engage in a keeper 17 secured to the bottom 8 by welding or other suitable manner.

The side 4 has an opening 18 to the fire pot and a door 19 is hingedly connected to the side 4 as is the usual practice. A flange 9 of the bottom is turned downwardly as indicated at 20 so that ashes or the like may be raked from the fire pot, also as is the usual practice. A grate 21 is provided for the interior of the fire pot section and has legs 22 engaging the bottom 8 of the fire pot. The grate is rounded and has sides 23 extending upwardly towards the front and back of the fire pot. It also has a plurality of openings 24 to increase the draft through the fuel thus providing better combustion thereof and also to allow ashes to sift through to the bottom of the fire pot. The upper periphery of the fire pot 2 is provided with an outwardly offset shoulder 25 and an upwardly extending flange 26 within which is adapted to be nested the lower edge 27 of the oven section 3. The oven section comprises a front 28, sides 29 and 30, a back 31 and top 32, the top having its edges turned downwardly forming a flange which may be secured to the top of the oven section in any suitable manner such as welding or the like.

The front 28 is provided with an opening 33 to provide access to the interior of the oven. A cover member 34 is provided for the openings 33 and is hingedly connected to the sides 29 adjacent the opening 33 of the oven as indicated at 35. The door or cover 34 has a front portion 36 and sides 37 and 37'. The bottom edge of the front side 36 is turned inwardly forming a flange 38 and a space 39 between the bottom of the cover member and the housing for a purpose later described. The cover is provided with a top 40, engaging over the top 32 of the oven section and has its rear edge turned upwardly as indicated at 41 to provide rigidity to the cover structure. The top 32 is provided with a struck down portion to form a recess 42 and the top 40 of the cover is provided with a struck down portion forming a boss 43 engaging in the recess 42 to retain the cover member in closed position by friction of the top 40 with the top 32 of the oven section. The front side 36 of the door is provided with a handle 44.

The upper edge of the front 28 of the oven section is turned inwardly forming a flange 45 to provide rigidity to the oven structure and the respective sides 29 and 30 of the oven section are provided with spaced side rails 46 and 47 to provide support for meat racks or the like 48 and 49. Adapted to be supported on the lower rails 47 underneath the rack 49 is a grill member 50 substantially having a bottom 51 and side portions 52 and 53, side portions being turned outwardly to form flanges 54 and 55 to engage the side rails 47. When the grill 50 is inserted in the oven section, it is of a width to provide a space 56 between the front end and the front wall 28 of the oven section as best illustrated in Fig. 3. Secured to the rear bottom edge of the grill 50 is a lug 57 adapted to engage the rear wall 31 of the oven section to hold the grill away from the back 31 to provide a space 58 between the grill and the back wall for a purpose later described, the lug 57 being secured to the bottom of the grill by welding or the like. The rails 46 and 47 are formed of sheet metal to provide an upstanding flange 46' and a shelf 47' to prevent sliding lateral movement of the racks and grill when in use.

Near the upper edge of the back portion 31 of the oven section is an opening 59 and mounted therein is a horizontally disposed stationary shaft 60 secured to the back portion by a bearing collar 61 secured to the back by rivets or the like 62. A relatively wide spirally wound bimetallic coil or spring 63 anchored at its inner end to the shaft 60 in any suitable manner whereby it becomes an integral part of shaft 60. The shaft 60 is bent at right angles to provide an arm 64 which is pivotally attached to a rod 64' extending downwardly along the back of the housing and is pivotally secured to an ear 65 on a draft regulator 66 pivotally secured to the lower edge of the fire pot section as indicated at 67 (Fig. 3). The draft regulator is adapted to cover an opening 68 of a duct 69 secured to the underneath side of the bottom 8 of the fire pot section over an opening 70 in said bottom to provide a draft to the fire pot section to facilitate burning of the fuel therein.

Operation of a device constructed and assembled as described is as follows:

When the device is in assembled condition as shown in Figs. 1, 3, and 4, fire is kindled on the grate 21 and the food to be barbecued or cooked placed upon the racks 48 and 49 or either of them as desired. Heat from the fire passes up through the fire pot section into the oven section and will heat the bottom 51 of the grill 50. The grill 50 acts as a baffle and the heat and smoke will pass up through the spaces 56 and 58 at the respective ends of the grill and a rack 49 being perforated will contact the meat or other food products thereon. The meat or other food products is inserted through the door opening 31 in the front of the oven section and the door covering 34 closed. The heat will rise to the top of the oven section and striking against the top 32 will accumulate there. The only place for the heat and smoke to move from the oven section is downwardly through the space 39 at the bottom of the door covering 34 as there is a tendency for the heated air to rise and the cooler air entering the space rising upwardly there will be a pressure of the heat upon the meat being cooked in the oven section, the smoke co-mingling with the meat to add flavor thereto while cooking. The smoke and heat will rise in the oven and be dissipated therefrom as indicated by the arrows Fig. 3. Temperature of the oven will be regulated by the automatic regulator in the top part of the oven through the bimetallic coil as above described, to raise and lower the draft regulator having communication with the duct at the bottom of the fire pot section.

The bottom 51 of the grill 50 will act as a baffle of the heat and smoke as it rises through the oven section. The grill may be also utilized for cooking of food such as potatoes or the like by placing the same thereon underneath the rack 49. Juices from the meat or other food products thereabove will drop down onto the food products on the grill thereby seasoning the same.

In Figs. 7, 8, and 9, there is disclosed a modified form of the invention consisting of a fire pot section constructed the same as in the preferred form of the invention and the parts thereof are given like numbers with the exception that the draft regulator on the air duct leading to the bottom of the fire pot section has a hand regulator comprising a threaded opening 71 adapted to receive the threaded shank 72 of a hand screw 73 regulating the size of the opening and amount of air to enter the fire pot.

The oven section 74 has its lower edge 75 adapted to nest in the fire pot section as in the preferred form of the invention. The oven section has a front 76, back 77, and sides 78 and 79. The top part of the oven section is substantially rectangular in shape and the sides 78 and 79 are tapered downwardly and inwardly to form a lower edge to nest within the top of the fire pot section.

The sides 78 and 79 are provided with spaced side rails 80 and 81. Adapted to be mounted upon the side rails 81 is a grill and baffle member 82 of a width to provide spaces 83 and 84 on the respective sides of the oven structure, the bottom of the rear portion of the grill being provided with a lug 85 to retain the grill away from the front side 76 and back side 77 as in the preferred form of the invention. The grill 82 has sloping sides as indicated at 86 and outturned flanges 87 to engage the side rails 81. Adapted to engage over the grill is a rack 88 also supported by the side rails 81 and a rack 89 is supported by the side rails 80 above the rack 88 so that meat to be prepared in the oven may be placed upon both racks 88 and 89 and other food products such as potatoes or the like, may also be prepared on the grill 82.

The oven section 74 has an open top so that the food may be inserted in the oven therethrough. Adapted to engage over the open top is a cover member 90 hingedly secured as at 91. At the back of the cover is a flange 92 which adds strength to said cover and also acts as a stop or rest when opened to allow access to racks. The cover is also provided with a handle 93.

The back 77 of the oven section is provided with an opening 94 and adapted to engage over the opening 94 is a closure member or cover 95 having a top 96 extending over the top 91 of the oven section and provided with pins or the like adapted to engage in openings 97 in the top of the oven so that it may be removably secured to the top. Latch members 97' are provided on the sides 78 and 79 to hold the cover member in place. The lower end of the cover is inturned providing a flange 98 and a space 99 is provided between the flange and the back 77 for dispensing smoke from the oven. The back 77 adjacent the opening 94 is turned inwardly to form a flange 100 to provide rigidity to the structure.

A shelf or shoulder 101 is provided on the front 76 and sides 78 and 79 near the top of the oven to provide a support for the downturned flange 102 on the cover member to provide a substantially air tight structure between the cover member and the oven section so that the heat when arising in the oven will be retained therein to cook or prepare the meat under pressure as in the preferred form of the invention.

The side rails 80 and 81 are the same as in the preferred form of the invention and consist of a piece of strap iron bent upon itself to form an angle shaped portion 103 so that the flanges 88 and 89 will not move around in the oven. In the preferred form of the invention it is necessary to have the racks offset from the sides so that they may be inserted and removed through the door opening 30 of the oven section.

Operation of the device shown in Figs. 7, 8 and 9, is substantially the same as in the preferred form of the invention except that in the modified form of the invention the draft is regulated by hand instead of automatically.

When it is desired to knock-down the device for transportation or storage, the legs are removed from the fire pot section, doors 19 and 34 removed, the grill and racks removed from the oven section and all stored in the fire pot section. The fire pot section telescopes within the oven section, the ends being reversed so that the lower end of the fire pot section will be inserted in the oven section.

It will be obvious from the foregoing that I have provided an improved portable knock-down barbecue oven whereby the meat will be cooked under pressure facilitating the cooking time thereof, and wherein the smoke from the fire will communicate with the meat to flavor the same. It will also be obvious that food may be cooked on the grill at the same time if desired, or it may be used separately as a grill.

What I claim and desire to secure by Letters Patent is:

1. A portable barbecue oven comprising, a housing including a fire pot section having an open top and an oven section having an open bottom removably mounted on the fire pot section and in communication therewith, said oven section having an opening in one side adjacent the upper end thereof providing access to said oven section, racks mounted in the upper portion of the oven section for supporting food to be cooked in position for access through said opening, a baffle in the oven section below the racks and having portions spaced from the sides thereof for passage of heat and smoke from the fire pot section into the oven section above the baffle, a cover having top, side and front walls, means removably mounting the cover on the oven section of the housing with the top and side walls engaged with the oven section above and at the sides of said opening, said side and front walls of the cover extending substantially below said opening with the front wall spaced from the oven section and forming a downwardly opening passage therebetween, said passage being open to the atmosphere at the lower end thereof and having communication adjacent the upper end with said opening in the oven section, and means at the lower end of the cover restricting the downwardly opening passage whereby heat and smoke from the fire pot section will pass upwardly in the oven section around the baffle to cook the food supported on the racks and then outwardly through said opening in the oven section and downwardly through the passage and restricted lower end thereof which retards escape of smoke from the oven section and effects a back pressure therein and aids in retaining moisture in the food being cooked.

2. A portable barbecue oven comprising, a housing including a fire pot section having an open top and an oven section having an open bottom removably mounted on the fire pot section and in communication therewith, said oven section having an opening in one side adjacent the upper end thereof providing access to said oven section, racks mounted in the upper portion of the oven section for supporting food to be cooked in position for access through said opening, a baffle in the oven section below the racks and having portions spaced from the sides thereof for passage of heat and smoke from the fire pot section into the oven section above the baffle, a cover having top, side and front walls, means hingedly mounting the cover on the oven section for engagement of the side walls with the oven section at the sides of the opening therein, said top wall of the cover extending over the top edge of the oven section, interengaging means on the oven section and cover top wall latching the cover to the oven section, said side and front walls of the cover extending substantially below the opening in the oven section with the front wall spaced from the oven section and forming a downwardly opening passage therebetween, said passage being open to the atmosphere at the lower end thereof and having communication adjacent the upper end with the opening in the oven section, and a flange on the lower end of the cover front wall and extending toward the oven section for restricting the downwardly opening passage whereby heat and smoke from the fire pot section will pass upwardly through the oven section around the baffle to cook the food supported on the racks and then outwardly through said opening in the oven section and downwardly through the passage and restricted lower end thereof which retards escape of smoke from the oven section and effects a back pressure therein and aids in retaining moisture in the food being cooked.

JAMES LESTER EASTEP.

References Cited in the file of this patent

UNITED STATES PATENTS

| Number | Name | Date |
| --- | --- | --- |
| Re. 986 | Shaw | May 29, 1860 |
| 209,332 | Darling | Oct. 29, 1878 |
| 231,068 | MacAlpin | Aug. 10, 1880 |
| 581,060 | Chambers | Apr. 20, 1897 |
| 594,993 | Harry | Dec. 7, 1897 |
| 1,014,149 | Helman | Jan. 9, 1912 |
| 1,634,517 | Rotstein | July 5, 1927 |

FOREIGN PATENTS

| Number | Country | Date |
| --- | --- | --- |
| 131,572 | Great Britain | Aug. 28, 1919 |
| 569,905 | France | Apr. 19, 1924 |
| 567,676 | Germany | Jan. 7, 1933 |